April 7, 1970   J. HOOGLAND ET AL   3,504,961

MODIFIED DOUBLE GAUSS OBJECTIVE

Filed April 1, 1968

INVENTORS.
Jan Hoogland
Ellis I. Betensky

BY

Irving M. Kriegsman
ATTORNEY.

United States Patent Office 3,504,961
Patented Apr. 7, 1970

3,504,961
MODIFIED DOUBLE GAUSS OBJECTIVE
Jan Hoogland, Wilton, and Ellis I. Betensky, Ridgefield, Conn., assignors to The Perkin-Elmer Corporation, Norwalk, Conn., a corporation of New York
Filed Apr. 1, 1968, Ser. No. 717,763
Int. Cl. G02b 9/62, 9/64, 11/34
U.S. Cl. 350—214
4 Claims

ABSTRACT OF THE DISCLOSURE

A modified double Gauss type objective having five components is further modified by adding a sixth component. This sixth component is a relatively thick meniscus element having radii that are about equal, is convex to the front and is positioned behind the fifth component.

This invention relates to optical objectives. More particularly, this invention relates to an optical objective of the modified double Gauss type for use in photography, microphotography, image converter tube applications and other similar purposes.

The double Gauss objective is a well-known type of optical objective of which the standard or norm consists of four components, the outer two being positive and the inner two being meniscus shaped negative components concave toward a central air space in which an aperture stop is mounted, at least one component on each side of the central airspace being compound for achromatizing the image. This standard type has been modified in various ways such as by splitting one or both of the positive components into two positive components each, by making more than two of the components compound, by introducing a small airspace into one or more of the components, or in other ways.

The following is a list of some of the printed publications on optical objectives pertinent to this invention: U.S. Patents 2,683,398; 2,701,982; 2,836,102; 2,846,923; 2,896,506; and 3,049,975.

It is an object of this invention to provide a new and improved optical objective.

It is another object of this invention to provide a new and improved optical objective.

It is another object of this invention to provide a new and improved optical objective of the double Gauss type.

It is still another object of this invention to provide a new and improved optical objective of large numerical aperture with high modulation transfer function at relatively low spatial frequencies over moderate field angles.

It is yet still another object of this invention to provide a new and improved optical objective of medium numerical aperture with high modulation transfer function at high spatial frequencies over moderate field angles.

It is a further object of this invention to provide a new and improved optical objective having thermostability of monochromatic aberrations, color aberrations as well as focal position over a temperature range of at least 200° F.

It is another object of this invention to provide a double Gauss type optical objective that is well corrected for all monochromatic and color aberrations at a relative aperture of at least up to about F/.9 and over a field of about 30 degrees.

The above and other objects are achieved by constructing an optical objective according to this invention.

Briefly, the objective is a six component, eight element modified double Gauss type objective in which the first component is a positive element having a convex surface convex to the front, the second component is a single positive meniscus concave toward a central airspace, the third and fourth components are meniscus shaped doublets, consisting of a positive and a negative element located on either side of and concave toward the central airspace, and the fifth component is a positive bioconvex element. As to these first five components the objective is somewhat similar to known versions of the modified double Gauss type objective. The sixth component is a single, meniscus shaped component with radii that are about equal, is relatively thick and is convex toward the central airspace. The sixth component not only functions as a field flattener, but also corrects for spherical aberration, coma, etc. The objective may be mounted in a stainless steel support to achieve thermostability. In one embodiment of the invention, the objective is made up as described above. In another embodiment, two identical objectives as described above are symmetrically arranged in series. One feature of the invention is the provision of the sixth component.

A clearer concept of the scope of the invention along with other advantages and features thereof will be obtained from the following detailed description taken in conjunction with the drawings, and the novel features will be particularly pointed out hereinafter in the appended claims.

Figure 1:
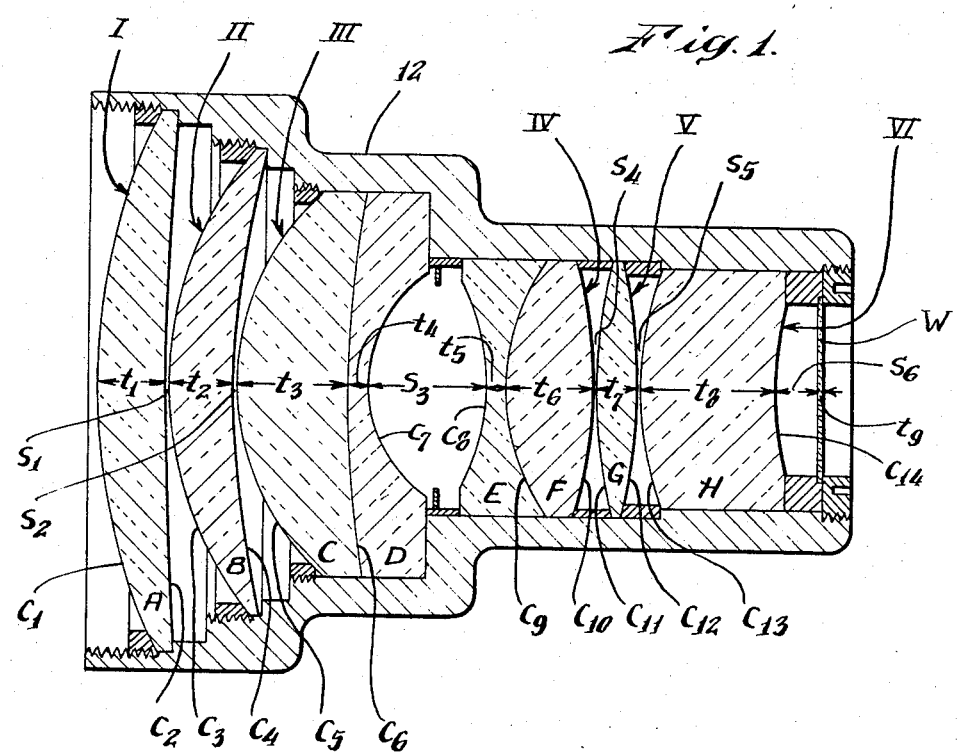
FIGURE 1 is an optical diagram of one embodiment of the invention.

Referring now to FIGURE 1, there is shown an embodiment of an optical objective constructed according to this invention. The objective comprises six components containing eight elements and is particularly suited for although not exclusively limited to image converter tube applications.

The first component (I) (starting from the front or object side) is a positive element A and has a convex surface that is convex to the front. The second component (II) is a positive meniscus element B and is convex to the front. The third component (III) is a negative meniscus shaped doublet, convex to the front and made up of a positive element C and a negative element D. The fourth component (IV) is a negative meniscus shaped doublet, concave to the front and made up of a negative element E and a positive element F. The fifth component (V) is a positive double convex element G. The sixth component (VI) is a relatively thick meniscus shaped element H, convex to the front and having radii that are about equal. The thickness of this sixth component (VI) is about between .18 and .45 times the effective focal length of the objective. The two radii of the sixth component (VI) differ in size by no more than a factor of about 1.5.

The objective may further include a window W positioned behind the sixth component (VI). The objective is mounted on a stainless steel supporting frame 12. The following table shows the constructional data for one example of an optical objective constructed according to the embodiment shown in FIGURE 1 without the window W. In the table, the components are designated by Roman numerals in ascending order from the front of the objective to the rear, with the light assumed to come from the front. The elements are designated by capital letters. The curvature of a surface is marked plus or minus depending on whether it is convex or concave, respectively, toward the incoming light. As is well known in the art, the curvature of a surface is equal to the reciprocal of its radius.

TABLE I

Focal Length=1.0000  Relative Aperture=f/1.0
Total Field of View=24°
Front Vertex Distance=1.6000
Back Focal Length=.1000
Stop Position=.1064 after rear surface of element D

| Component | Element | Curvature | Thickness or Spacing | Index of Refraction, $n$ | Abbe No., $v$ |
|---|---|---|---|---|---|
| I | A | $C_1=.8476$ | $t_1=.1420$ | 1.64304 | 60.10 |
|   |   | $C_2=.2135$ | $S_1=.0050$ | Air |  |
| II | B | $C_3=1.2594$ | $t_2=.1420$ | 1.64304 | 60.10 |
|   |   | $C_4=.5662$ | $S_2=.0050$ | Air |  |
| III | {C | $C_5=1.8126$ | $t_3=.2450$ | 1.64304 | 60.10 |
|   | {D | $C_6=.2256$ | $t_4=.0400$ | 1.70445 | 30.07 |
|   |   | $C_7=3.4190$ | $S_3=.2454$ | Air |  |
| IV | {E | $C_8=-1.9682$ | $t_5=.0400$ | 1.64062 | 35.34 |
|   | {F | $C_9=2.1671$ | $t_6=.2000$ | 1.7480 | 44.77 |
|   |   | $C_{10}=-1.2190$ | $S_4=.0247$ | Air |  |
| V | G | $C_{11}=.6277$ | $t_7=.1039$ | 1.80688 | 46.76 |
|   |   | $C_{12}=-.4426$ | $S_5=.0010$ | Air |  |
| VI | H | $C_{13}=1.3435$ | $t_8=.2969$ | 1.80688 | 46.76 |
|   |   | $C_{14}=1.4405$ |  |  |  |

The following table shows the constructional data for another example of an optical objective constructed according to the embodiment shown in FIGURE 1. In this example, the window W is included.

TABLE II

Focal Length=1.0053  Relative Aperture=f/0.95
Total Field of View=24°
Front Vertex Distance=1.6064
Back Focal Length=.0006
Stop Position=.1399 after element D

| Component | Element | Curvature | Thickness or Spacing | Index of Refraction, $n$ | Abbe No., $v$ |
|---|---|---|---|---|---|
| I | A | $C_1=.7632$ | $t_1=.1460$ | 1.61997 | 60.33 |
|   |   | $C_2=.1671$ | $S_1=.0150$ | Air |  |
| II | B | $C_3=1.2820$ | $t_2=.1351$ | 1.61997 | 60.33 |
|   |   | $C_4=.5538$ | $S_2=.0166$ | Air |  |
| III | {C | $C_5=1.8376$ | $t_3=.2431$ | 1.63992 | 60.10 |
|   | {D | $C_6=.2589$ | $t_4=.0400$ | 1.69902 | 30.07 |
|   |   | $C_7=3.3668$ | $S_3=.2630$ | Air |  |
| IV | {E | $C_8=-1.9289$ | $t_5=.0400$ | 1.63637 | 35.34 |
|   | {F | $C_9=2.1277$ | $t_6=.1999$ | 1.74357 | 44.77 |
|   |   | $C_{10}=-1.2390$ | $S_4=.0053$ | Air |  |
| V | G | $C_{11}=.8666$ | $t_7=.0980$ | 1.67008 | 47.11 |
|   |   | $C_{12}=-.4748$ | $S_5=.0042$ | Air |  |
| VI | H | $C_{13}=1.3571$ | $t_8=.2939$ | 1.67008 | 47.11 |
|   |   | $C_{14}=1.5182$ | $S_6=.0970$ | Air |  |
| W |   | $C_{15}=0.0000$ | $t_9=.0087$ | 1.45852 | 67.25 |
|   |   | $C_{16}=0.0000$ |  |  |  |

Figure 2:
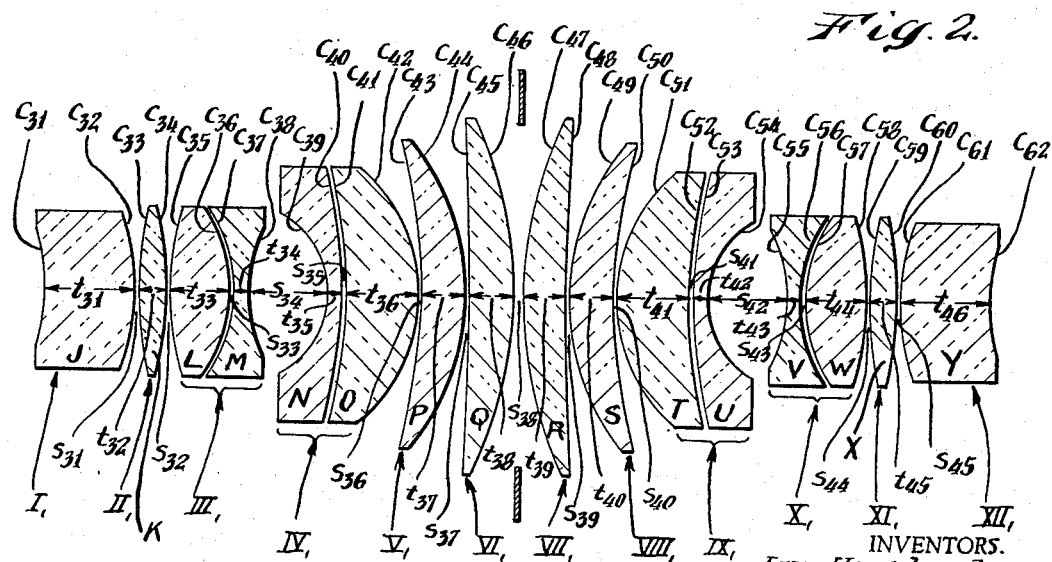
FIGURE 2 is an optical diagram of another embodiment of the invention.

Referring now to FIGURE 2, there is shown another embodiment of the invention. The objective comprises twelve components containing sixteen elements and is especially suited for although not exclusively limited to microphotography applications. Basically, the objective is made up of two identical objectives of the type similar to that shown in FIGURE 1, symmetrically arranged about a central stop with the long conjugate side of each objective facing the stop.

Thus, starting from the front, the first component ($I_1$) is a relativly thick meniscus shaped single element J, concave to the front and having radii that are about equal. The second component ($II_1$) is a positive double convex element K. The third component ($III_1$) is a negative meniscus shaped doublet, convex to the front and made up of a positive element L and a negative element M. The fourth component ($IV_1$) is a negative meniscus shaped doublet, concave to the front and made up of a negative element N and a positive element O. The fifth component ($V_1$) is a positive meniscus element P concave to the front. The sixth component ($VI_1$) is a positive element Q having a convex surface convex to the rear. Components ($VII_1$) through ($XII_1$) are identical to components ($VI_1$) through ($I_1$) respectively, however, each component is facing in the opposite direction from its counterpart. For example, component ($I_1$) and ($XII_1$) are identical, with the front surface of component ($I_1$) corresponding to the rear surface of component ($XII_1$). However, component ($XII_1$) is convex to the front rather than to the rear.

The following table shows the constructional data for an example of an objective constructed according to the embodiment shown in FIGURE 2:

TABLE III

Object Distance=25.000  Object to Image Distance=800.001  
Relative Aperture=$f/2.5$  Back Focal Length=25.000  
Stop Position=0.5000 after element S

| Component | Element | Curvature | Thickness or Spacing | Index of Refraction, $n$ | Abbe No., $v$ |
|---|---|---|---|---|---|
| $I_1$ | J | $C_{31}=-8.8713\times10^{-3}$ | $t_{31}=76.0000$ | 1.68804 | 46.39 |
|  |  | $C_{32}=-6.3375\times10^{-3}$ | $S_{31}=6.9615$ | Air |  |
| $II_1$ | K | $C_{33}=1.4609\times10^{-3}$ | $t_{32}=20.0000$ | 1.68804 | 46.39 |
|  |  | $C_{34}=-6.3342\times10^{-3}$ | $S_{32}=20.0740$ | Air |  |
|  | L | $C_{35}=4.0614\times10^{-3}$ | $t_{33}=29.3579$ | 1.76507 | 44.08 |
| $III_1$ |  | $C_{36}=-8.6012\times10^{-3}$ | $S_{33}=.2000$ | Air |  |
|  | M | $C_{37}=-8.7081\times10^{-3}$ | $t_{34}=15.0000$ | 1.65963 | 33.51 |
|  |  | $C_{38}=8.0012\times10^{-3}$ | $S_{34}=73.6333$ | Air |  |
|  | N | $C_{39}=-1.3640\times10^{-2}$ | $t_{35}=15.0000$ | 1.72940 | 27.78 |
| $IV_1$ |  | $C_{40}=-3.8035\times10^{-3}$ | $S_{35}=6.0000$ | Air |  |
|  | O | $C_{41}=-3.5706\times10^{-3}$ | $t_{36}=57.6511$ | 1.63313 | 62.27 |
|  |  | $C_{42}=-7.1013\times10^{-3}$ | $S_{36}=1.0000$ | Air |  |
| $V_1$ | P | $C_{43}=-3.1545\times10^{-3}$ | $t_{37}=20.0000$ | 1.63313 | 62.27 |
|  |  | $C_{44}=-4.4520\times10^{-3}$ | $S_{37}=13.6224$ | Air |  |
| $VI_1$ | Q | $C_{45}=4.9672\times10^{-6}$ | $t_{38}=20.0000$ | 1.63313 | 62.27 |
|  |  | $C_{46}=-3.3676\times10^{-3}$ | $S_{38}=1.0000$ | Air |  |
| $VII_1$ | R | $C_{47}=3.3676\times10^{-3}$ | $t_{39}=20.0000$ | 1.63313 | 62.27 |
|  |  | $C_{48}=-4.9672\times10^{-6}$ | $S_{39}=13.6224$ | Air |  |
| $VIII_1$ | S | $C_{49}=4.4520\times10^{-3}$ | $t_{40}=20.0000$ | 1.63313 | 62.27 |
|  |  | $C_{50}=3.1545\times10^{-3}$ | $S_{40}=1.0000$ | Air |  |
|  | T | $C_{51}=7.1013\times10^{-3}$ | $t_{41}=57.6511$ | 1.63313 | 62.27 |
|  |  | $C_{52}=3.5706\times10^{-3}$ | $S_{41}=6.0000$ | Air |  |
| IX |  | $C_{53}=3.8035\times10^{-3}$ | $t_{42}=15.0000$ | 1.72940 | 27.78 |
|  | U | $C_{54}=1.3540\times10^{-2}$ | $S_{42}=73.6333$ | Air |  |
|  |  | $C_{55}=-8.0012\times10^{-3}$ | $t_{43}=15.0000$ | 1.65963 | 33.51 |
|  | V | $C_{56}=8.7081\times10^{-3}$ | $S_{43}=.2000$ | Air |  |
| $X_1$ |  | $C_{57}=8.6012\times10^{-3}$ | $t_{44}=29.3579$ | 1.76507 | 44.08 |
|  | W | $C_{58}=-4.0614\times10^{-3}$ | $S_{44}=20.0740$ | Air |  |
|  |  | $C_{59}=6.3342\times10^{-3}$ | $t_{45}=20.0000$ | 1.68804 | 46.39 |
| $XI_1$ | X | $C_{60}=-1.4609\times10^{-3}$ | $S_{45}=6.9615$ | Air |  |
|  |  | $C_{61}=6.3375\times10^{-3}$ | $t_{46}=76.0000$ | 1.68804 | 46.39 |
| $XII_1$ | Y | $C_{62}=8.8713\times10^{-3}$ |  |  |  |

Although this invention has been described with respect to specific embodiments thereof, it is understood that these are not to be considered as limiting the invention set forth in the appended claims.

What is claimed is:

1. An optical objective especially suited for use in microphotography comprising from the front to the rear:
  (a) a relatively thick meniscus component ($I_1$) concave to the front and having radii that are about equal;
  (b) a double convex component ($II_1$);
  (c) a negative meniscus component ($III_1$) concave to the rear;
  (d) a negative meniscus component ($IV_1$) concave to the front;
  (e) a positive meniscus component ($V_1$) convex to the rear;
  (f) a positive component ($VI_1$) having a convex surface convex to the rear;
  (g) a positive meniscus component ($VII_1$) convex to the front;
  (h) a positive meniscus component ($VIII_1$) convex to the front;
  (i) a negative meniscus component ($IX_1$) concave to the rear;
  (j) a negative meniscus component ($X_1$) concave to the front;
  (k) a double convex component ($XI_1$); and
  (l) a relatively thick meniscus component ($XII_1$) convex to the front and having radii that are about equal.

2. The objective according to claim 1 and characterized by the following constructional data:

TABLE III

Object Distance=25.000  Object to Image Distance=800.001
Relative Aperture=f/2.5  Back Focal Length=25.000
Stop Position=0.5000 after element S

| Component | Element | Curvature | Thickness or Spacing | Index of Refraction, $n$ | Abbe No., $v$ |
|---|---|---|---|---|---|
| $I_1$ | J | $C_{31}=-8.8713\times10^{-3}$ | $t_{31}=76.0000$ | 1.68804 | 46.39 |
|  |  | $C_{32}=-6.3375\times10^{-3}$ | $S_{31}=6.9615$ | Air |  |
| $II_1$ | K | $C_{33}=1.4609\times10^{-3}$ | $t_{32}=20.0000$ | 1.68804 | 46.39 |
|  |  | $C_{34}=-6.3342\times10^{-3}$ | $S_{32}=20.0740$ | Air |  |
|  | L | $C_{35}=4.0614\times10^{-3}$ | $t_{33}=29.3579$ | 1.76507 | 44.08 |
| $III_1$ |  | $C_{36}=-8.6012\times10^{-3}$ | $S_{33}=.2000$ | Air |  |
|  | M | $C_{37}=-8.7081\times10^{-3}$ | $t_{34}=15.0000$ | 1.65963 | 33.51 |
|  |  | $C_{38}=8.0012\times10^{-3}$ | $S_{34}=73.6333$ | Air |  |
|  | N | $C_{39}=-1.3640\times10^{-2}$ | $t_{35}=15.0000$ | 1.72940 | 27.78 |
| $IV_1$ |  | $C_{40}=-3.8035\times10^{-3}$ | $S_{35}=6.0000$ | Air |  |
|  | O | $C_{41}=-3.5706\times10^{-3}$ | $t_{36}=57.6511$ | 1.63313 | 62.27 |
|  |  | $C_{42}=-7.1013\times10^{-3}$ | $S_{36}=1.0000$ | Air |  |
| $V_1$ | P | $C_{43}=-3.1545\times10^{-3}$ | $t_{37}=20.0000$ | 1.63313 | 62.27 |
|  |  | $C_{44}=-4.4520\times10^{-3}$ | $S_{37}=13.6224$ | Air |  |
| $VI_1$ | Q | $C_{45}=4.9672\times10^{-6}$ | $t_{38}=20.0000$ | 1.63313 | 62.27 |
|  |  | $C_{46}=-3.3676\times10^{-3}$ | $S_{38}=1.0000$ | Air |  |
| $VII_1$ | R | $C_{47}=3.3676\times10^{-3}$ | $t_{39}=20.0000$ | 1.63313 | 62.27 |
|  |  | $C_{48}=-4.9672\times10^{-6}$ | $S_{39}=13.6224$ | Air |  |
| $VIII_1$ | S | $C_{49}=4.4520\times10^{-3}$ | $t_{40}=20.0000$ | 1.63313 | 62.27 |
|  |  | $C_{50}=3.1545\times10^{-3}$ | $S_{40}=1.0000$ | Air |  |
|  | T | $C_{51}=7.1013\times10^{-3}$ | $t_{41}=57.6511$ | 1.63313 | 62.27 |
| $IX_1$ |  | $C_{52}=3.5706\times10^{-3}$ | $S_{41}=6.0000$ | Air |  |
|  | U | $C_{53}=3.8035\times10^{-3}$ | $t_{42}=15.0000$ | 1.72940 | 27.78 |
|  |  | $C_{54}=1.3540\times10^{-2}$ | $S_{42}=73.6333$ | Air |  |
|  | V | $C_{55}=-8.0012\times10^{-3}$ | $t_{43}=15.0000$ | 1.65963 | 33.51 |
| $X_1$ |  | $C_{56}=8.7081\times10^{-3}$ | $S_{43}=.2000$ | Air |  |
|  | W | $C_{57}=8.6012\times10^{-3}$ | $t_{44}=29.3579$ | 1.76507 | 44.08 |
|  |  | $C_{58}=-4.0614\times10^{-3}$ | $S_{44}=20.0740$ | Air |  |
| $XI_1$ | X | $C_{59}=6.3342\times10^{-3}$ | $t_{45}=20.0000$ | 1.68804 | 46.39 |
|  |  | $C_{60}=-1.4609\times10^{-3}$ | $S_{45}=6.9615$ | Air |  |
| $XII_1$ | Y | $C_{61}=6.3375\times10^{-3}$ | $t_{46}=76.0000$ | 1.68804 | 46.39 |
|  |  | $C_{62}=8.8713\times10^{-3}$ |  |  |  |

3. An optical objective comprising from the front to the rear:
   (a) a positive component (I) having a convex surface convex to the front;
   (b) a positive meniscus component (II) convex to the front;
   (c) a negative meniscus component (III) concave to the rear;
   (d) a negative meniscus component (IV) concave to the front;
   (e) a bioconvex component (V);
   (f) a relatively thick meniscus component (VI) convex to the front and having radii that are about equal; and (g) said components being characterized by the following constructional data:

(c) a negative meniscus component (III) concave to the rear;

TABLE I

Focal Length=1.0000  Relative Aperture=f/1.0
Total Field of View=24°
Front Vertex Distance=1.6000
Back Focal Length=.1000
Stop Position=.1064 after rear surface of element D

| Component | Element | Curvature | Thickness or Spacing | Index of Refraction, $n$ | Abbe. No., $v$ |
|---|---|---|---|---|---|
| I | A | $C_1=.8476$ | $t_1=.1420$ | 1.64304 | 60.10 |
|   |   | $C_2=.2135$ | $S_1=.0050$ | Air |   |
| II | B | $C_3=1.2594$ | $t_2=.1420$ | 1.64304 | 60.10 |
|    |   | $C_4=.5662$ | $S_2=.0050$ | Air |   |
| III | C | $C_5=1.8126$ | $t_3=.2450$ | 1.64304 | 60.10 |
|     | D | $C_6=.2256$ | $t_4=.0400$ | 1.70445 | 30.07 |
|     |   | $C_7=3.4190$ | $S_3=.2454$ | Air |   |
| IV | E | $C_8=-1.9682$ | $t_5=.0400$ | 1.64062 | 35.34 |
|    | F | $C_9=2.1671$ | $t_6=.2000$ | 1.7480 | 44.77 |
|    |   | $C_{10}=-1.2190$ | $S_4=.0247$ | Air |   |
| V | G | $C_{11}=.6277$ | $t_7=.1039$ | 1.80688 | 46.76 |
|   |   | $C_{12}=-.4426$ | $S_5=.0010$ | Air |   |
| VI | H | $C_{13}=1.3435$ | $t_8=.2969$ | 1.80688 | 46.76 |
|    |   | $C_{14}=1.4405$ |   |   |   |

4. An optical objective comprising from the front to the rear:
   (a) a positive component (I) having a convex surface convex to the front;
   (b) a positive meniscus component (II) convex to the front;
   (c) a negative meniscus component (III) concave to the rear (implied);
   (d) a negative meniscus component (IV) concave to the front;
   (e) a bioconvex component (V);
   (f) a relatively thick meniscus component (VI) convex to the front and having radii that are about equal; and
   (g) said components being characterized by the following constructional data:

TABLE II

Focal Length=1.0053  Relative Aperture=f/0.95
Total Field of View=24°
Front Vertex Distance=1.6064
Back Focal Length=.0006
Stop Position=.1399 after element D

| Component | Element | Curvature | Thickness or Spacing | Index of Refraction, $n$ | Abbe. No., $v$ |
|---|---|---|---|---|---|
| I | A | $C_1=.7632$ | $t_1=.1460$ | 1.61997 | 60.33 |
|   |   | $C_2=.1671$ | $S_1=.0150$ | Air |   |
| II | B | $C_3=1.2820$ | $t_2=.1351$ | 1.61997 | 60.33 |
|    |   | $C_4=.5538$ | $S_2=.0166$ | Air |   |
| III | C | $C_5=1.8376$ | $t_3=.2431$ | 1.63992 | 60.10 |
|     | D | $C_6=.2589$ | $t_4=.0400$ | 1.69902 | 30.07 |
|     |   | $C_7=3.3668$ | $S_3=.2630$ | Air |   |
| IV | E | $C_8=-1.9289$ | $t_5=.0400$ | 1.63637 | 35.34 |
|    | F | $C_9=2.1277$ | $t_6=.1999$ | 1.74357 | 44.77 |
|    |   | $C_{10}=-1.2390$ | $S_4=.0053$ | Air |   |
| V | G | $C_{11}=.8666$ | $t_7=.0980$ | 1.67008 | 47.11 |
|   |   | $C_{12}=-.4748$ | $S_5=.0042$ | Air |   |
| VI | H | $C_{13}=1.3571$ | $t_8=.2939$ | 1.67008 | 47.11 |
|    |   | $C_{14}=1.5182$ | $S_6=.0970$ | Air |   |
| W |   | $C_{15}=0.0000$ | $t_9=.0087$ | 1.45852 | 67.25 |
|   |   | $C_{16}=0.0000$ |   |   |   |

(References on following page)

References Cited
UNITED STATES PATENTS
2,828,671   4/1958   Murakami _____ 350—215

FOREIGN PATENTS
22,079   10/1964   Japan.

JOHN K. CORBIN, Primary Examiner

U.S. Cl. X.R.

350—215